(12) United States Patent
Lee et al.

(10) Patent No.: US 11,506,343 B2
(45) Date of Patent: Nov. 22, 2022

(54) SYSTEM FOR STORING SOLID STATE HYDROGEN

(71) Applicants: Hyundai Motor Company, Seoul (KR); KIA Motors Corporation, Seoul (KR)

(72) Inventors: Ji Sung Lee, Hwaseong-si (KR); Jun Seok Seo, Gunpo-si (KR); Ji Hye Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 412 days.

(21) Appl. No.: 16/884,501

(22) Filed: May 27, 2020

(65) Prior Publication Data

US 2021/0180752 A1 Jun. 17, 2021

(30) Foreign Application Priority Data

Dec. 12, 2019 (KR) .................. 10-2019-0166033

(51) Int. Cl.

| F17C 11/00 | (2006.01) |
| C01B 3/00 | (2006.01) |
| H01M 8/04082 | (2016.01) |
| B01J 20/06 | (2006.01) |
| B01J 20/28 | (2006.01) |

(52) U.S. Cl.
CPC .............. *F17C 11/005* (2013.01); *B01J 20/06* (2013.01); *B01J 20/28009* (2013.01); *C01B 3/0026* (2013.01); *C01B 3/0063* (2013.01); *C01B 3/0084* (2013.01); *H01M 8/04216* (2013.01); *F17C 2221/012* (2013.01); *F17C 2225/0138* (2013.01); *F17C 2270/0184* (2013.01); *H01M 2250/20* (2013.01)

(58) Field of Classification Search
CPC .......... H01M 2250/20; H01M 8/04216; C01B 3/0026; C01B 3/0063; C01B 3/0084; F17C 11/005
See application file for complete search history.

(56) References Cited

U.S. PATENT DOCUMENTS

| 2014/0178291 A1 | 6/2014 | Bennington et al. |
| 2020/0055023 A1* | 2/2020 | Murph ............... B01J 20/28007 |
| 2021/0293689 A1* | 9/2021 | Hunyadi Murph ...... G01N 7/02 |

FOREIGN PATENT DOCUMENTS

| JP | 2004-250255 A | 9/2004 |
| KR | 10-0818944 B1 | 4/2008 |
| KR | 10-2009-0062587 A | 6/2009 |
| KR | 10-2013-0137831 A | 12/2013 |

* cited by examiner

*Primary Examiner* — Matthew J Merkling
(74) *Attorney, Agent, or Firm* — McDonnell Boehnen Hulbert & Berghoff LLP

(57) ABSTRACT

A system for storing solid state hydrogen includes: a solid state hydrogen storage pellet including a magnetic material and storing solid state hydrogen therein; an inner container surrounding the solid state hydrogen storage pellet; and a coil surrounding the inner container, wherein when current is supplied to the coil, the current reacts with the magnetic material included in the solid state hydrogen storage pellet to form an induction magnetic field, thereby heating the solid state hydrogen storage pellet.

10 Claims, 5 Drawing Sheets

SYSTEM FOR STORING SOLID STATE HYDROGEN

CROSS-REFERENCE TO RELATED APPLICATIONS

The present application claims priority to Korean Patent Application No. 10-2019-0166033, filed on Dec. 12, 2019, the entire contents of which is incorporated herein for all purposes by this reference.

BACKGROUND

1. Technical Field

The present disclosure relates to a system for storing solid state hydrogen, and more particularly, to a system for storing solid state hydrogen enabling uniform heat control by applying an induction magnetic field to a solid state hydrogen storage material in which a magnetic material is uniformly dispersed.

2. Description of the Related Art

A dependence on a conventional fossil fuel resource and a resulting contamination lead to an urgent need for a cleaner fuel resource for a safer energy future. Hydrogen is spotlighted as one of the alternatives for the conventional fossil fuel.

A hydrogen battery vehicle using hydrogen as its fuel needs to store as much hydrogen as possible in a limited space in order to increase a mileage of the vehicle. Therefore, hydrogen gas is mainly compressed and stored in the vehicle. Here, a general method of storing hydrogen is to compress gaseous state hydrogen and store compressed hydrogen in a high pressure tank. In this manner, the same hydrogen capacity can be stored in conditions of low pressure and small volume, and thus studies have been actively conducted to occlude hydrogen in a solid compound.

Solid compounds used for storing hydrogen in solid state (i.e. metal hydride) include lithium amide family, lanthanum nickel hydride ($LaNi_5H_6$), sodium aluminum hydride ($NaAlH_4$), magnesium amide ($Mg(NH_2)_2$) and the like. However, reaction heat occurs when hydrogen is occluded in such a solid compound.

This reaction heat is exothermic reaction and affects a structure of the surrounding solid compound, which slows a reaction rate at which hydrogen is occluded in the solid compound.

When hydrogen is occluded and stored in the solid compound, the above exothermic reaction occurs; whereas, when the hydrogen fuel vehicle is driven and hydrogen is released, an endothermic reaction occurs to absorb the heat of the surrounding solid compound.

Here, the solid compound needs to be supplied with additional heat to reach its reaction temperature. However, it is difficult to supply the heat up to the reaction temperature of the solid compound when utilizing waste heat of the vehicle. To solve this problem, there is a need for a heat exchanger removing or supplying the heat.

Meanwhile, the solid compound may be filled in the high pressure tank in various forms such as powder or a pellet. Here, in order to store as much hydrogen as possible, as many solid compounds as possible need to be filled in an internal high pressure container. For this purpose, the following method is commonly used: compressing the powder or pellet into a bulk shape rather than a bulky powder form which is bulky due to its large internal pores, and then disposing the bulk in the container.

In most cases, it is preferable to properly dispose the heat exchanger and the solid compound in the high pressure tank so that the reaction heat occurring in the tank is removed by a heat exchanger disposed in a limited space in the tank. However, when using an internal heater tube or the like, it is difficult to have uniform heat exchange therein.

SUMMARY

An object of the present disclosure is to provide a system for storing solid state hydrogen enabling uniform heat control by applying an induction magnetic field to a solid state hydrogen storage material in which a magnetic material is uniformly dispersed.

According to an embodiment of the present disclosure, a system for storing solid state hydrogen includes: a solid state hydrogen storage pellet including a magnetic material and storing solid state hydrogen therein; an inner container surrounding the solid state hydrogen storage pellet; and a coil surrounding the inner container, wherein when current is supplied to the coil, the current may react with the magnetic material included in the solid state hydrogen storage pellet to form an induction magnetic field, thereby heating the solid state hydrogen storage pellet.

The solid state hydrogen storage pellet may include solid state hydrogen storage material into which the magnetic material is uniformly mixed.

The system for storing solid state hydrogen may further include: a power supplier supplying the current to the coil; and a controller controlling supply of the current from the power supplier to the coil depending on whether hydrogen is stored in or released from the solid state hydrogen storage pellet.

The system for storing solid state hydrogen may further include a first cooling tube formed in a tube shape, having the coil disposed therein and cooling the solid state hydrogen storage pellet by a cooling fluid circulating therein.

The first cooling tube may include: a first tube surrounding the coil; and a second tube surrounding the first tube in a state of being spaced apart from the first tube by a predetermined distance and having the cooling fluid circulating therein.

The first cooling tube may surround an outer side of the inner container.

The system for storing solid state hydrogen may further include a second cooling tube formed in a tube shape and cooling the solid state hydrogen storage pellet by the cooling fluid circulating therein.

The second cooling tube may be formed to surround but not to overlap either the coil or an outer side of the inner container.

The system for storing solid state hydrogen may further include an outer container surrounding the solid state hydrogen storage pellet, the inner container and the coil.

The outer container may include: a cooling fluid inlet through which the cooling fluid is introduced; a cooling fluid outlet through which the cooling fluid is discharged; and a hydrogen inlet into which hydrogen is introduced.

The magnetic material may include ferrite oxide (FeOx) or lanthanum manganite ($LaMnO_3$)-based material.

The solid state hydrogen storage pellet may be formed to have a thickness between a minimum range and a maximum range of a magnetic induction region formed by the coil, and the solid state hydrogen storage pellet and the coil may be disposed to have a separation distance between the minimum range and the maximum range of the magnetic induction region in which magnetic induction is possible.

DETAILED DESCRIPTION

Figure 1:
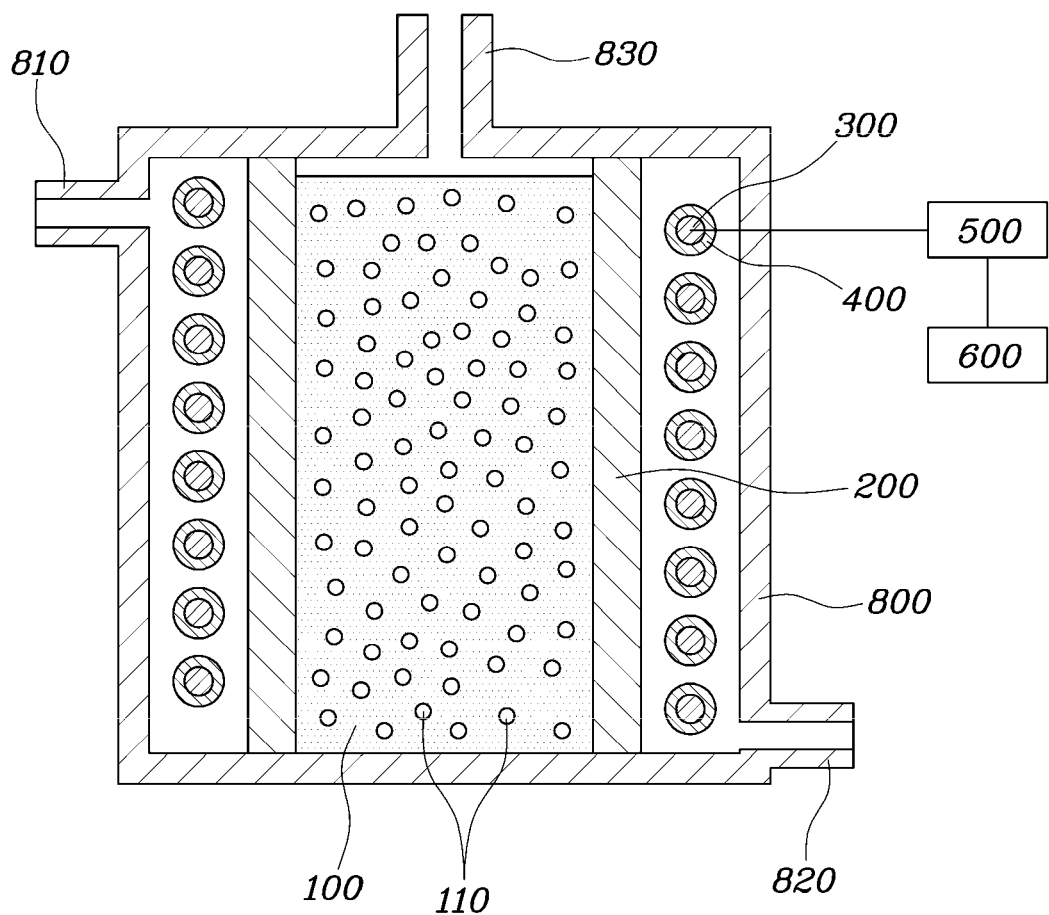
FIG. 1 is a block diagram of a system for storing solid state hydrogen, according to an embodiment of the present disclosure.

Hereinafter, embodiments of the present disclosure are described in detail with reference to the accompanying drawings so that those skilled in the art may easily practice the present disclosure. However, the present disclosure may be implemented in various different forms and is not limited to the embodiments described herein.

In addition, in the drawings, portions unrelated to the description are omitted to obviously describe the present disclosure, and similar portions are denoted by similar reference numerals throughout the specification.

Throughout the present specification, unless explicitly described to the contrary, to "comprise" any components is understood to imply the inclusion of other elements rather than the exclusion of the other elements.

Figure 2:
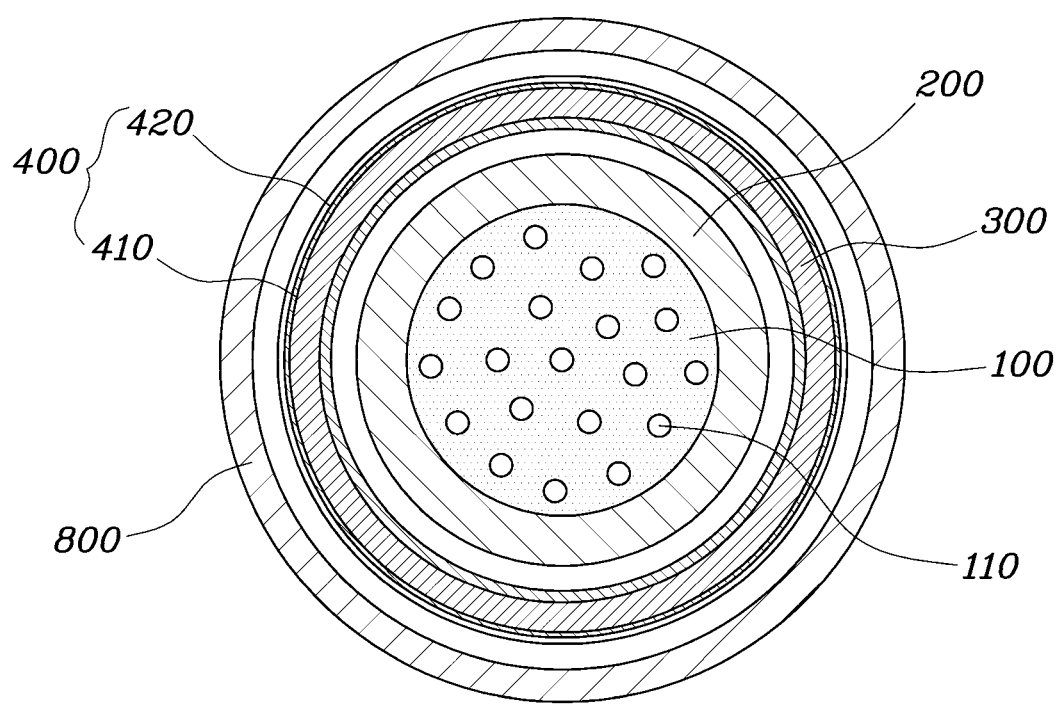
FIG. 2 is a plan view of a system for storing solid state hydrogen, according to an embodiment of the present disclosure.
Figure 3:
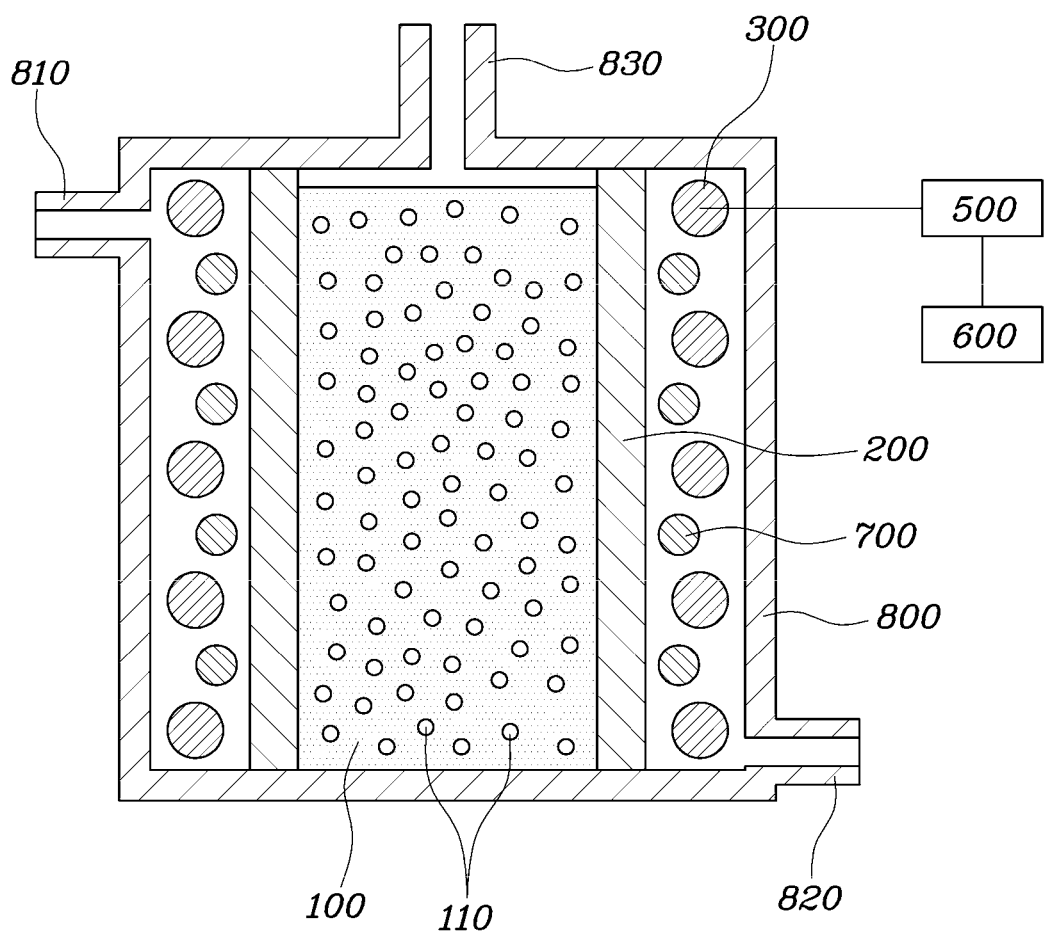
FIG. 3 is a block diagram of a system for storing solid state hydrogen, according to another embodiment of the present disclosure.
Figure 4:
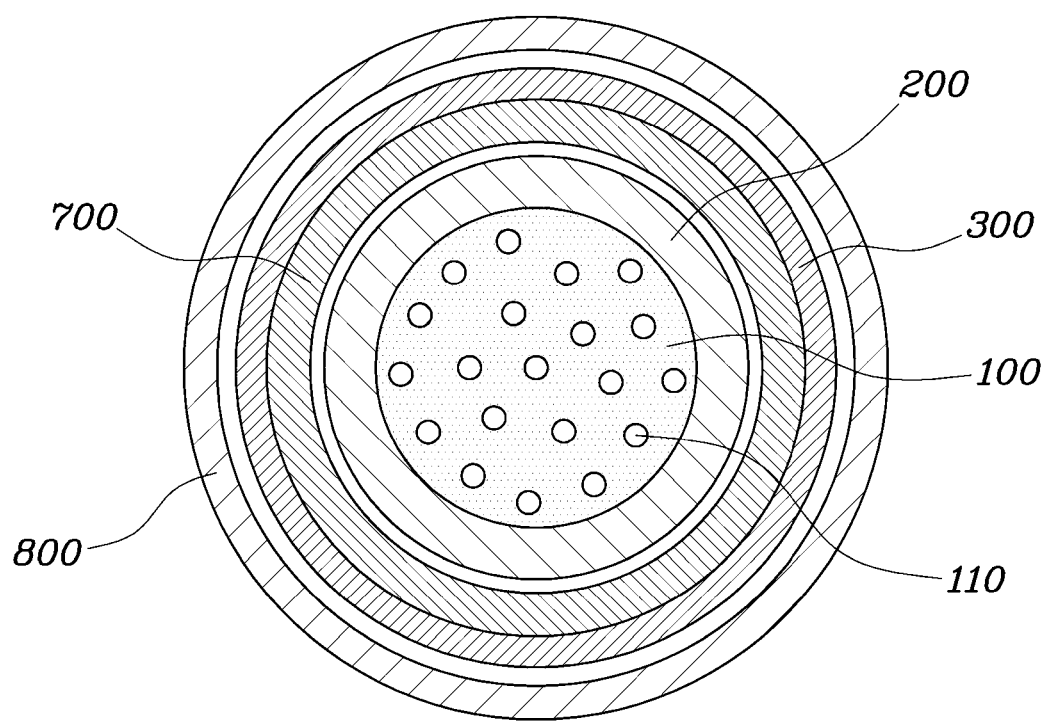
FIG. 4 is a plan view of a system for storing solid state hydrogen, according to another embodiment of the present disclosure.

FIG. 1 is a block diagram of a system for storing solid state hydrogen according to an embodiment of the present disclosure; FIG. 2 is a plan view of a system for storing solid state hydrogen according to an embodiment of the present disclosure; FIG. 3 is a block diagram of a system for storing solid state hydrogen according to another embodiment of the present disclosure; and FIG. 4 is a plan view of a system for storing solid state hydrogen according to another embodiment of the present disclosure.

Referring to FIGS. 1 and 2, a system for storing solid state hydrogen according to an embodiment of the present disclosure includes: a solid state hydrogen storage pellet 100 including a magnetic material 110 and storing solid state hydrogen therein; an inner container 200 surrounding the solid state hydrogen storage pellet; and a coil 300 surrounding the inner container. The system for storing solid state hydrogen according to an embodiment of the present disclosure may further include one or more of a first cooling tube 400, a power supplier 500, a controller 600 and an outer container 800.

The solid state hydrogen storage pellet 100 may be a pellet including the magnetic material 110 and capable of storing or releasing the solid state hydrogen. In detail, the solid state hydrogen storage pellet 100 may include a solid state hydrogen storage material into which the magnetic material 110 is uniformly mixed. According to an embodiment, the solid state hydrogen storage material may be a complex hydrate including magnesium hydride ($MgH_2$), sodium aluminum hydride ($NaAlH_4$) and the like. In addition, the magnetic material 110 may be a ferromagnetic nanomaterial including ferrite oxide (FeOx) or lanthanum manganite ($LaMnO_3$)-based material. According to an embodiment, the magnetic material 110 may include magnetite ($Fe_3O_4$) or lanthanum manganese (LaMnOX).

According to an embodiment of the present disclosure, the solid state hydrogen storage pellet 100 may be formed to have a thickness between a minimum range and a maximum range of a magnetic induction region formed by the coil 300 to be described below. In addition, the solid state hydrogen storage pellet 100 and the coil 300 may be disposed to have a separation distance between the minimum range and the maximum range of the magnetic induction region in which magnetic induction is possible.

Meanwhile, according to an embodiment of the present disclosure, when current is supplied to the coil 300, the current may react with the magnetic material 110 included in the solid state hydrogen storage pellet to form an induction magnetic field, thereby heating the solid state hydrogen storage pellet. This technique in which when the current is supplied to the coil 300, heat is generated by the current reacting with the magnetic material 110 to form the induction magnetic field is a known technique disclosed in Korean Patent No. 10-0818944. Therefore, a detailed description thereof is omitted.

As described above, according to an embodiment of the present disclosure, a nanomagnetic material 110 in a powder form is uniformly dispersed in the solid state hydrogen storage pellet 100. Accordingly, when the current is supplied to the coil, the induction magnetic field may be formed in an entire of the solid state hydrogen storage pellet by the nanomagnetic material 110 uniformly dispersed in the solid state hydrogen storage pellet, thereby uniformly heating the solid state hydrogen storage pellet.

The first cooling tube 400 may be formed in a tube shape, have the coil 300 disposed therein and cool the solid state hydrogen storage pellet 100 by a cooling fluid circulating therein. In detail, the first cooling tube 400 may include: a first tube 410 surrounding the coil 300; and a second tube 420 surrounding the first tube 410 in a state of being spaced apart from the first tube 410 by a predetermined distance and having the cooling fluid circulating therein. In addition, the first cooling tube 400 may be formed to surround an outer side of the inner container 200.

That is, according to an embodiment, the first cooling tube 400 may have a double tube type including the first tube 410 having the coil 300 disposed therein and the second tube 420 surrounding the first tube 410.

In addition, the cooling fluid may be introduced and discharged respectively through a cooling fluid inlet 810 and a cooling fluid outlet 820, which are formed in the outer container 800 to be described below. The solid state hydrogen storage pellet may be cooled by the introduced cooling fluid.

The power supplier 500 serves to supply the current to the coil 300.

In addition, the controller 600 may control supply of the current from the power supplier 500 to the coil 300 depending on whether hydrogen is stored in or release from the solid state hydrogen storage pellet 100.

In detail, in case that hydrogen is stored in the solid state hydrogen storage pellet 100 according to an embodiment, the controller 600 may cool the solid state hydrogen storage pellet 100 by preventing the current from being supplied from the power supplier 500 to the coil 300 and allowing the coolant fluid to circulate in the first cooling tube 400.

In addition, in case that hydrogen is released from the solid state hydrogen storage pellet 100 according to another embodiment, the controller 600 may heat the solid state hydrogen storage pellet by allowing the current to be supplied from the power supplier 500 to the coil 300 and thus to react with the magnetic material 110 included in the solid state hydrogen storage pellet to form an induction magnetic field. Magnitude and frequency of the induction magnetic field formed here may be determined depend on a type of solid state hydrogen storage material and a temperature of the solid state hydrogen storage pellet.

Meanwhile, the system for storing solid state hydrogen according to an embodiment of the present disclosure may further include the outer container 800 surrounding the solid state hydrogen storage pellet 100, the inner container 200, the coil 300 and the first cooling tube 400. Here, the outer container 800 may be implemented in a form of an outer tank or a case forming a hydrogen storage system.

In addition, the outer container 800 may be formed to include: the cooling fluid inlet 810 through which the cooling fluid is introduced; the cooling fluid outlet 820 through which the cooling fluid is discharged; and a hydrogen inlet 830 into which hydrogen stored in the solid state hydrogen storage pellet 100 is introduced.

Meanwhile, referring to FIGS. 3 and 4, a system for storing solid state hydrogen according to another embodiment of the present disclosure may include: a solid state hydrogen storage pellet 100 storing solid state hydrogen therein; an inner container 200 surrounding the solid state hydrogen storage pellet; and a coil 300 surrounding the inner container. The system for storing solid state hydrogen according to another embodiment of the present disclosure may further include one or more of a power supplier 500, a controller 600, a second cooling tube 700 and an outer container 800.

The solid state hydrogen storage pellet 100 may be a pellet including a magnetic material 110 and capable of storing or releasing the solid state hydrogen. In detail, the solid state hydrogen storage pellet 100 may include a solid state hydrogen storage material into which the magnetic material 110 is uniformly mixed. According to another embodiment, the solid state hydrogen storage material may be a complex hydrate including magnesium hydride ($MgH_2$), sodium aluminum hydride ($NaAlH_4$) and the like. In addition, the magnetic material 110 may be a ferromagnetic nanomaterial including ferrite oxide (FeOx) or lanthanum manganite ($LaMnO_3$)-based material. According to another embodiment, the magnetic material 110 may include magnetite ($Fe_3O_4$) or lanthanum manganese (LaMnOX).

According to another embodiment of the present disclosure, the solid state hydrogen storage pellet 100 may be formed to have a thickness between a minimum range and a maximum range of a magnetic induction region formed by the coil 300 to be described below. In addition, the solid state hydrogen storage pellet 100 and the coil 300 may be disposed to have a separation distance between the minimum range and the maximum range of the magnetic induction region in which magnetic induction is possible.

Meanwhile, according to another embodiment of the present disclosure, when current is supplied to the coil 300, the current may react with the magnetic material 110 included in the solid state hydrogen storage pellet to form an induction magnetic field, thereby heating the solid state hydrogen storage pellet.

As described above, according to another embodiment of the present disclosure, a magnetic material 110 comprises a nanomagnetic material in a powder form that is uniformly dispersed in the solid state hydrogen storage pellet 100. Accordingly, when the current is supplied to the coil, the induction magnetic field may be formed in an entire of the solid state hydrogen storage pellet by the nanomagnetic material 110 uniformly dispersed in the solid state hydrogen storage pellet, thereby uniformly heating the solid state hydrogen storage pellet.

The second cooling tube 700 may be formed in a tube shape and cool the solid state hydrogen storage pellet 100 by a cooling fluid circulating therein. Here, as shown in FIGS. 3 and 4, the second cooling tube 700 may be formed to surround but not to overlap either the coil 300 or an outer side of the inner container.

That is, the system for storing solid state hydrogen according to another embodiment of the present disclosure is configured to include the separate second cooling tube 700 cooling the solid state hydrogen storage pellet 100. As shown in FIGS. 3 and 4, the coil 300 and the second cooling tube 700 may each be formed to surround but not to overlap an outer side of the inner container 200.

In addition, the cooling fluid may be introduced and discharged respectively through a cooling fluid inlet 810 and a cooling fluid outlet 820, which are formed in the outer container 800. The solid state hydrogen storage pellet may be cooled by the introduced cooling fluid.

The power supplier 500 serves to supply the current to the coil 300.

In addition, the controller 600 may control supply of the current from the power supplier 500 to the coil 300 depending on whether hydrogen is stored in or released from the solid state hydrogen storage pellet 100.

In detail, in case that hydrogen is stored in the solid state hydrogen storage pellet 100 according to another embodiment, the controller 600 may cool the solid state hydrogen storage pellet 100 by preventing the current from being supplied from the power supplier 500 to the coil 300 and allowing the coolant fluid to circulate in the second cooling tube 700.

In addition, in case that hydrogen is released from the solid state hydrogen storage pellet 100 according to another embodiment, the controller 600 may heat the solid state hydrogen storage pellet by allowing the current to be supplied from the power supplier 500 to the coil 300 and thus to react with the magnetic material 110 included in the solid state hydrogen storage pellet to form an induction magnetic field. Magnitude and frequency of the induction magnetic field formed here may be determined depend on a type of solid state hydrogen storage material and a temperature of the solid state hydrogen storage pellet.

Meanwhile, the system for storing solid state hydrogen according to another embodiment of the present disclosure may further include the outer container 800 surrounding the solid state hydrogen storage pellet 100, the inner container 200, the coil 300 and the second cooling tube 700. Here, the outer container 800 may be implemented in a form of an outer tank or a case forming a hydrogen storage system.

In addition, the outer container 800 may be formed to have the cooling fluid inlet 810 through which the cooling fluid is introduced, the cooling fluid outlet 820 through which the cooling fluid is discharged, and a hydrogen inlet 830 into which hydrogen stored in the solid state hydrogen storage pellet 100 is introduced.

Figure 5:
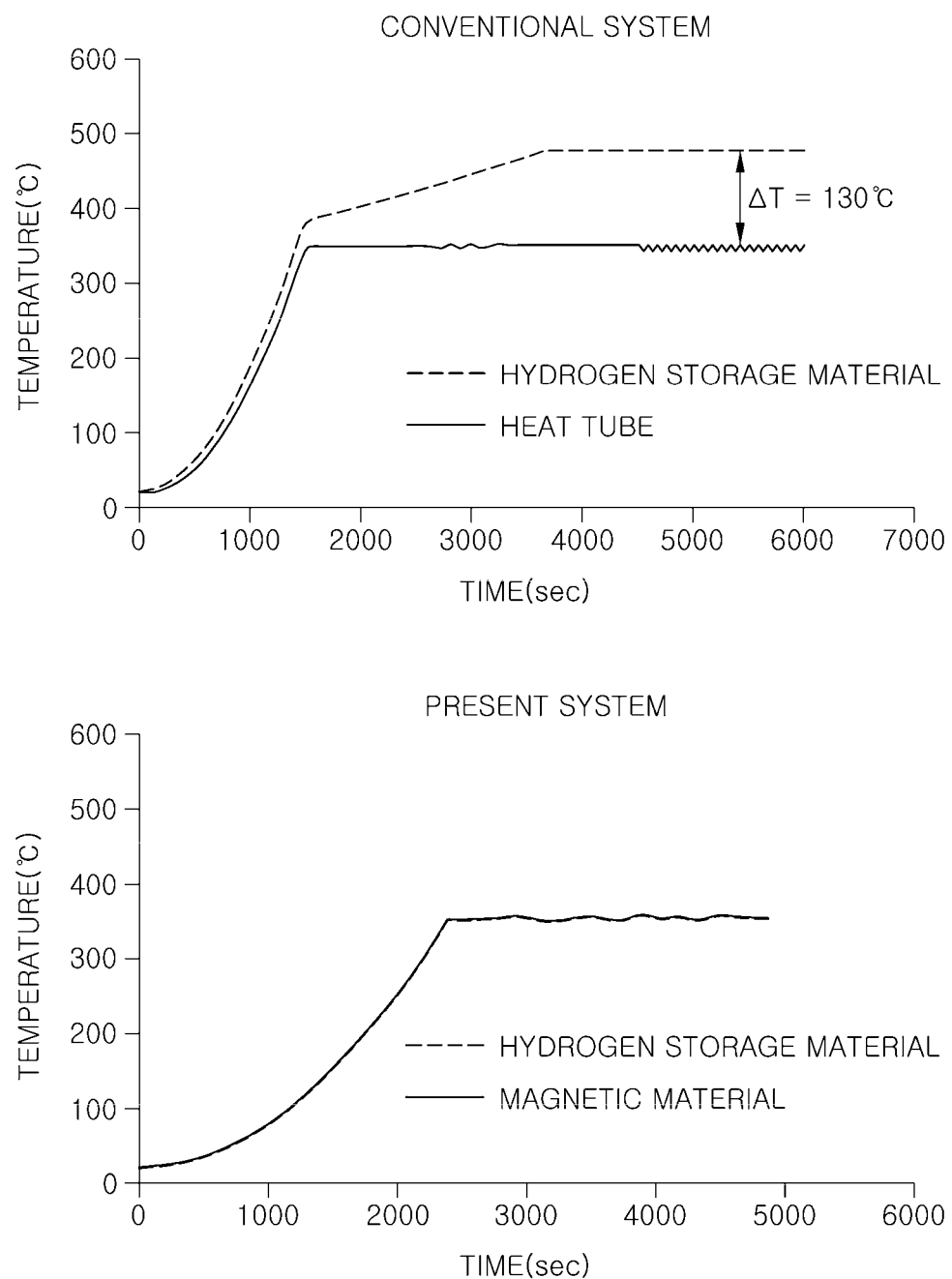
FIG. 5 is a view for explaining a heat transfer state of a system for storing solid state hydrogen according to an embodiment of the present disclosure and a system for storing solid state hydrogen using a conventional heat tube.

FIG. 5 is a view for explaining a heat transfer state of a system for storing solid state hydrogen according to an embodiment of the present disclosure and a system for storing solid state hydrogen using a conventional heat tube.

In detail, referring to FIG. 5, in the system for storing solid state hydrogen in which the conventional heat tube is disposed at a center thereof, there is a temperature difference between the heat tube at the center and a hydrogen storage material when the system reaches a thermal equilibrium state. Therefore, the conventional system for storing solid state hydrogen has low thermal efficiency.

To the contrary, in the system for storing solid state hydrogen according to the present disclosure, the magnetic material 110 serving as a heat source is uniformly dispersed in the solid state hydrogen storage material. Accordingly, when the system reaches the thermal equilibrium state, there is no temperature difference between the magnetic material 110 and the hydrogen storage material, and thus the temperature of the magnetic material 110 may be efficiently controlled. In addition, the solid state hydrogen storage material may be uniformly heated because the magnetic material 110 is uniformly dispersed in the solid state hydrogen storage material.

According to the present disclosure, it is possible to implement the system for storing solid state hydrogen enabling uniform heat control by applying the induction magnetic field to the solid state hydrogen storage material in which the magnetic material 110 is uniformly dispersed.

In addition, it is possible to increase a filling amount of the solid state hydrogen storage material by not using the heater tube conventionally inserted into the system for storing solid state hydrogen.

The embodiments of the present disclosure are not implemented only through the above-described device and/or method. Although the embodiments of the present disclosure are described in detail hereinabove, the scope of the present disclosure is not limited thereto, but may include various modifications and alterations made by those skilled in the art using a basic concept of the present disclosure as defined in the claims.

What is claimed is:

1. A system for storing solid state hydrogen, the system comprising:
   a solid state hydrogen storage pellet including a magnetic material and storing solid state hydrogen therein;
   an inner container surrounding the solid state hydrogen storage pellet; and
   a coil surrounding the inner container; and
   a first cooling tube formed in a tube shape, having the coil disposed therein and cooling the solid state hydrogen storage pellet by a cooling fluid circulating therein, wherein the first cooling tube includes:
   a first tube surrounding the coil; and
   a second tube surrounding the first tube in a state of being spaced apart from the first tube by a predetermined distance and having the cooling fluid circulating therein,
   wherein when current is supplied to the coil, the current reacts with the magnetic material included in the solid state hydrogen storage pellet to form an induction magnetic field, thereby heating the solid state hydrogen storage pellet.

2. The system for storing solid state hydrogen of claim 1, wherein the solid state hydrogen storage pellet includes a solid state hydrogen storage material into which the magnetic material is uniformly mixed.

3. The system for storing solid state hydrogen of claim 1, further comprising:
   a power supplier supplying the current to the coil; and
   a controller for controlling supply of the current from the power supplier to the coil depending on whether hydrogen is stored in or released from the solid state hydrogen storage pellet.

4. The system for storing solid state hydrogen of claim 1, wherein the first cooling tube surrounds an outer side of the inner container.

5. The system for storing solid state hydrogen of claim 1, further comprising a second cooling tube formed in a tube shape and cooling the solid state hydrogen storage pellet by a cooling fluid circulating therein.

6. The system for storing solid state hydrogen of claim 5, wherein the second cooling tube is formed to surround but not to overlap either the coil or an outer side of the inner container.

7. The system for storing solid state hydrogen of claim 1, further comprising an outer container surrounding the solid state hydrogen storage pellet, the inner container and the coil.

8. The system for storing solid state hydrogen of claim 7, wherein the outer container includes: a cooling fluid inlet through which a cooling fluid is introduced; a cooling fluid outlet through which the cooling fluid is discharged; and a hydrogen inlet into which hydrogen is introduced.

9. The system for storing solid state hydrogen of claim 1, wherein the magnetic material includes ferrite oxide (FeOx) or lanthanum manganite ($LaMnO_3$)-based material.

10. The system for storing solid state hydrogen of claim 1,
   wherein the solid state hydrogen storage pellet is formed to have a thickness between a minimum range and a maximum range of a magnetic induction region formed by the coil, and
   the solid state hydrogen storage pellet and the coil are disposed to have a separation distance between the minimum range and the maximum range of the magnetic induction region in which magnetic induction is possible.

* * * * *